United States Patent [19]

Inoue

[11] Patent Number: 4,577,082
[45] Date of Patent: Mar. 18, 1986

[54] ELECTRICAL MACHINING METHOD AND APPARATUS WITH EVOLVED-GAS LASER DETOXIFICATION

[75] Inventor: Kiyoshi Inoue, Tokyo, Japan

[73] Assignee: Inoue-Japax Research Incorporated, Kanagawa, Japan

[21] Appl. No.: 500,855

[22] Filed: Jun. 3, 1983

[30] Foreign Application Priority Data

Jun. 3, 1982 [JP] Japan .................................. 57-95718

[51] Int. Cl.⁴ ............................................. B23H 1/10
[52] U.S. Cl. ............................... 219/69 D; 204/157.61
[58] Field of Search ................... 422/4, 22, 120, 121; 219/69 D, 69 M, 69 R, 121 LM, 121 LQ, 121 LU, 121 LV; 204/162 R, 162 HE, 157.1, 158

[56] References Cited

U.S. PATENT DOCUMENTS

| | | | |
|---|---|---|---|
| 3,225,206 | 12/1965 | Strong et al. | 219/121 LX |
| 3,616,375 | 10/1971 | Inoue | 204/162 R |
| 3,878,352 | 4/1975 | Inoue | 219/69 D |
| 3,977,952 | 8/1976 | Knoevenagel et al. | 204/162 R |
| 4,124,466 | 11/1978 | Morrey | 204/158 R |
| 4,230,546 | 10/1980 | Ronn | 204/157.1 |
| 4,303,483 | 12/1981 | Ham et al. | 204/157.1 R |
| 4,303,486 | 12/1981 | Bard et al. | 204/162 R |
| 4,369,348 | 1/1983 | Stetson et al. | 219/121 LM |
| 4,406,763 | 9/1983 | Hsu et al. | 204/162 HE |
| 4,519,882 | 5/1985 | Reddy et al. | 204/158 R |
| 4,526,664 | 7/1985 | Feldman | 204/157.1 R |

FOREIGN PATENT DOCUMENTS

| | | | |
|---|---|---|---|
| 2536573 | 2/1977 | Fed. Rep. of Germany | 219/121 LM |
| 697224 | 9/1953 | United Kingdom | 204/162 R |
| 1239383 | 7/1971 | United Kingdom | 204/157.1 |
| 784680 | 1/1982 | U.S.S.R. | 204/157.1 |

Primary Examiner—Clifford C. Shaw
Assistant Examiner—Geoffrey S. Evans
Attorney, Agent, or Firm—Karl F. Ross; Herbert Dubno

[57] ABSTRACT

An electrical machining method and apparatus in which a gaseous effluent containing noxious or unacceptable gaseous components is evolved from the electrical machining gap and is collected in a space immediately above the gap flooding electrical machining liquid and confined from direct escape into the atmosphere. This space or chamber is arranged to communicate with the atmosphere via an elongated fluid conduit for drawing the collected gases into the atmosphere. A laser generator irradiates the flowing gases with a laser beam to decompose the noxious components into their constituent elements. Mirrors for the laser beam may be vibrated to laterally oscillate the laser beam, thereby enhancing the efficiency of the laser irradiation and the resulting gas detoxification.

8 Claims, 1 Drawing Figure

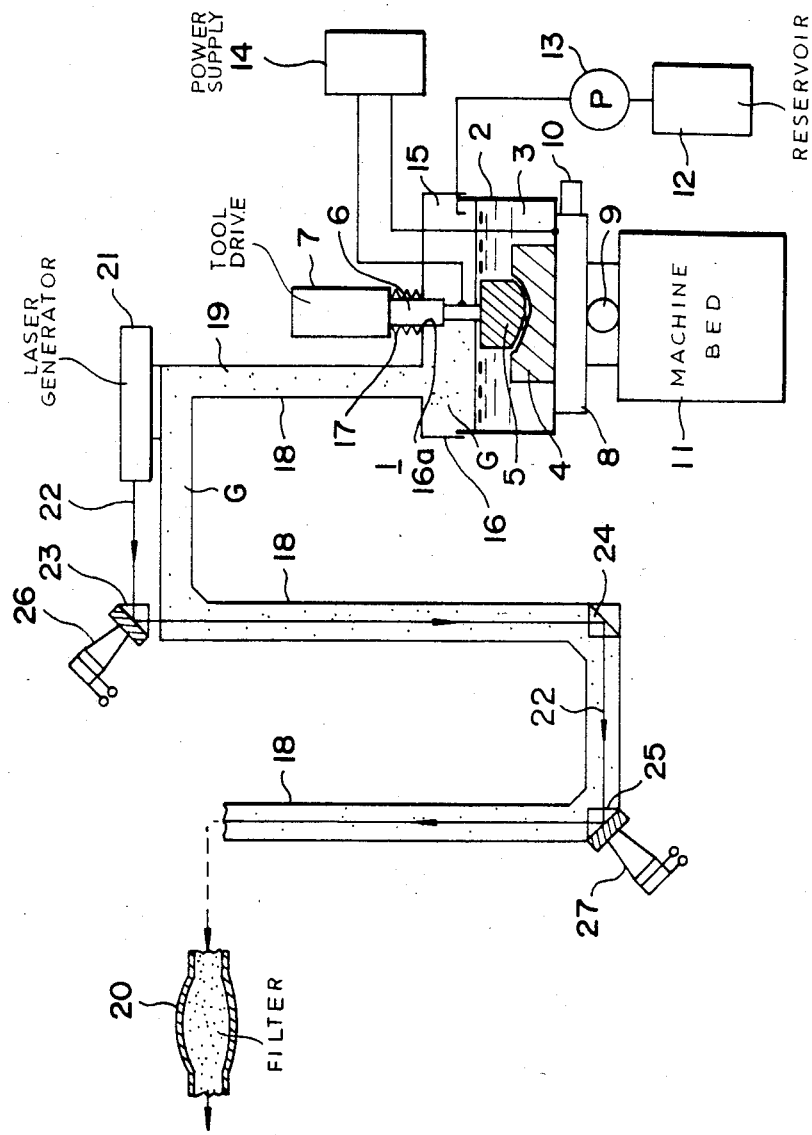

ELECTRICAL MACHINING METHOD AND APPARATUS WITH EVOLVED-GAS LASER DETOXIFICATION

FIELD OF THE INVENTION

The present invention relates to the art of electrical machining and, more particularly, to a new and improved electrical machining method and apparatus using or incorporating means which can perform anti-pollution functions effectively and which may also serve a fire-preventing means.

BACKGROUND OF THE INVENTION

In the art of electrical machining it has long been recognized that noxious or harmful gases are generated from a machining gap across which an electric current is supplied between a tool electrode and a workpiece to erosively remove material from the workpiece. The machining gap is flooded with a machining liquid medium which is decomposed into these gases as a result of passage of the machining electric current. In electrical discharge machining (EDM), for example, the machining liquid can advantageously be kerosene, transformer oil or like hydrocarbon which is decomposed to generate, among others, gaseous components (e.g. propane, hexane, benzene, etc) which are toxic and also inflammable. While an EDM machining liquid primarily composed of water which is harmless and not inflammable may be employed, it has been found to be desirable that the water liquid should, for the sake of increasing the machining efficiency, include some proportion of one or more of these hydrocarbons, or silicone oil which upon decomposition emits gaseous components such as carbon monoxide which are again hazardous to life and the environment. In electrochemical machining (ECM), electrochemical-discharge machining (ECDM), electrochemical grinding (ECG) and electrochemical-discharge grinding (ECDG) processes, nitride, nitrate and carbonate salts are known to be principal or additive electrolytic compounds which assure excellent machining results but upon electrolytic or discharge decomposition yield nitrogen oxides (NOx) and carbon monoxide which are toxic.

In the conventional electrical machining equipment, these noxious or harmful gases are either simply allowed to be emitted, causing pollution of the atmosphere in the region of the equipment, or are treated at a considerable cost but only with limited results as to detoxification or innocuousness.

OBJECTS OF THE INVENTION

The present invention seeks to provide a new and improved electrical machining method whereby noxious or harmful gases evolved from the electrical machining gap are decomposed substantially into their constituent elements which are innocuous.

The present invention also seeks to provide a new and improved electrical machining apparatus incorporating a relatively simple and economical means capable of decomposing these hazardous gases into their constituent elements efficiently.

SUMMARY OF THE INVENTION

In accordance with the present invention there is provided, in a first aspect thereof, a method of electrically machining a workpiece wherein a machining electric current is passed across a machining gap flooded with a liquid machining medium between a tool electrode and the workpiece to decompose supplied liquid machining medium while erosively removing material from the workpiece whereby noxious or unacceptable gases are evolved from the machining gap, which method includes: collecting the gases in a space immediately above the flooding liquid machining medium and confining the collected gases against direct escape into the atmosphere; and passing the collected gases through a fluid passage separated from the atmosphere while irradiating with a laser beam the gases flowing through the said passage to decompose at least a major portion of the noxious or unacceptable gases into their constituent elements.

The invention also provides, in a second aspect thereof, an electrical machining apparatus for machining a conductive workpiece wherein a machining electric current is supplied across a machining gap flooded with a liquid machining medium between a tool electrode and the workpiece to decompose the supplied liquid machining medium and to erosively remove material from the workpiece whereby noxious or unacceptable gases are evolved from the machining gap, which apparatus includes means for collecting the gases evolved in a space immediately above the flooding liquid machining medium and confining the gases from passage direct to the atmosphere; fluid conduit means for communicating the communicating the said space with the atmosphere through an elongate fluid passage in said conduit and drawing the space with the atmosphere and permitting the gases through the said passage; and laser means for irradiating the gases flowing along the said passage with a laser beam to decompose at least a major portion of the noxious or unacceptable gases into their constituent elements.

BRIEF DESCRIPTION OF THE DRAWING

These and other features of the present invention as well as advantages thereof will become more readily apparent from a reading of the following description when taken with reference to the accompanying drawing in which the sole FIGURE is a schematic view partly in section, diagrammatically illustrating an electrical machining apparatus embodying the present invention.

SPECIFIC DESCRIPTION

Referring now to the drawing, an electrical machining apparatus designated at 1 includes a worktank 2 retaining a machining liquid medium 3 therein in which a workpiece 4 is immersed secured in position. A tool electrode 5 is spacedly juxtaposed in the liquid medium 3 with the workpiece 2 and securely supported by a tool spindle 6 which is vertically displaceable by a tool drive 7 to advance the tool electrode 5 into the workpiece 2 as material removal of the latter continues. The worktank 4 is securely mounted on a worktable 8 which can be moved horizontally by a pair of motors 9 and 10 on a machine bed 11 to establish a machining position of the workpiece 4. The machining liquid medium 3 is replenished in the worktank 2 from a reservoir 12 under the action of a pump 13. A machining electric current is supplied from a power supply 14 between the tool electrode 5 and the workpiece 4 to erosively remove material from the workpiece 4 and at the same time to decompose the liquid machining medium 3 flooding into the machining gap into gases G which include noxious or harmful gaseous components.

The gases G evolved from the machining gap are collected in a chamber or space 15 immediately above the body of the liquid machining medium 3, the collected gases being confined by means of a cover member 16 against direct escape into the atmosphere. Here, a bellows-type sleeve 17 is attached at its one end to the cover member 16 and is secured at its other end to the machine head 7, surrounding the spindle 6 which is accommodated through an aperture 16a formed in the cover member so that the spindle 6 can freely move vertically move freely while ensuring the fluid tightness of the chamber 15.

The cover member 16 has also one end of an exhaust duct 18 secured thereto which is constructed in the form of combined U-shapes and provides an elongate passage 19 for the effluent compressing the gases G collected in the chamber 15 and to be exhausted. The other end of the duct 18 communicates with the atmosphere via a filter 20.

A laser generator 21 is mounted on a shoulder of the exhaust duct 18 to produce a laser beam 22 which is reflected by a mirror 23 in the form of a prism for projection into the fluid passage 19 through a transparent wall portion of the duct 18. Further mirrors or prisms 24 and 25 are disposed in the passage 19 at corners or elbow portion of the duct 18 to reflect the laser beam 22 along the passage 19 so that the gases G drawn through the passage 19 can be subjected thoroughly to the radiation of the laser beam 22. Furthermore, the mirrors 23 and 25 have electromechanical vibrators 26 and 27 attached thereto respectively to laterally oscillate the optical axis of the laser beam 22, thereby enhancing the efficiency of the thorough laser-beam irradiation of the gases G flowing along the confined passage 19.

In the operation of the apparatus shown, the machining products are carried away from the machining gap with the flooding machining liquid medium. Solid components of these products are allowed to settle by their own gravity for return to the reservoir 12 upon filtration while gases, vapors and mists float onto the surface of the body of the liquid 3 and are collected in the chamber 15. The kinds of gases G depend on the particular kind of machining liquid 3 used, and in general these gases include $H_2$, $C_6H_6$, $C_3H_8$, $C_6H_{12}$, $C_8H_{14}$, $CH_3OH$, $CO$, $CO_2$ and $NO_x$ which mostly are either toxic or unacceptacle to life. Furthermore, the gaseous hydrocarbons are highly inflammable and can explode upon contact with spark discharges in the machining gap.

The gases G containing these components, while drawn along the passage 19, are subjected to the laser beam radiation 22 and thereby decomposed into their constituent elements, i.e. oxygen, carbon, hydrogen and nitrogen. The filter 20 is used to collect and adsorb carbon as well as residual mists and some other remaining non-gaseous components. Thus, a clean fluid is allowed to issue from the exhaust duct system 18, 19, 20.

EXAMPLE I

Using a transformer oil as the liquid machining medium, a steel workpiece 4 is machined by electrical discharge machining with a brass electrode 5. The effluent comprising the gases G collected in the chamber 15 is found to contain by weight 0.02% carbon monoxide, 20% hydrogen, 30% propane ($C_3H_8$), 13% cyclohexane, 22% hexane ($C_6H_{14}$) and 14.98% others including benzene (C6H6). The gaseous effluent is drawn through a passage 19 and there irradiated with a YAG (gas) laser beam of 100 W. As a result, it is found that 78% of the compound gases (other than hydrogen) are decomposed into hydrogen and carbon. When mechanical vibrations of a frequency of 38 kHz are imparted to the mirrors 23 and 25 by the vibrators 26 and 27, it is found that the rate of decomposition is increased to 98%.

EXAMPLE II

Using tap water deionized to have a specific resistance of $10^4$ ohm-cm and containing 1% by weight silicone oil, a steel workpiece 4 is electrically machined with a graphite electrode 5. The effluent comprising the gases G collected in the chamber 15 is found to contain by weight 95% water vapor, 0.8% carbon dioxide, 3% hydrogen, 0.01% carbon monoxide and 0.119% others. The gaseous effluent is treated as in EXAMPLE I with a like laser beam. It is found that the treated gases G contain only a trace of carbon monoxide.

There is thus provided, in accordance with the present invention, a new, improved and useful method of and apparatus for electrical machining with means capable of effectively and efficiently assuring anti-pollution and also fail-safe machining operations.

What is claimed is:

1. A method of electrically machining a conductive workpiece wherein a machining electric current is passed across a machining gap flooded with a liquid machining medium between a tool electrode and the workpiece to decompose the liquid machining medium and to erosively remove material from the conductive workpiece whereby a gaseous machining effluent comprising noxious gases is evolved from the machining gap, the method including the steps of:
   collecting the effluent in a space immediately above the liquid machining medium and confining the collected effluence against direct escape into the atmosphere;
   passing the collected machining effluent through an elongate fluid flow passage communicating said space with the atmosphere; and
   irradiating the machining effluent flowing through said passage with a laser beam guided to pass longitudinally along said elongate fluid flow passage whereby to decompose at least a major portion of the noxious gases in said flowing machining effluent into their constituent elements.

2. The method defined in claim 1, further comprising the step of laterally oscillating said laser beam passing longitudinally through said elongate fluid flow passage within a width thereof to enhance the efficiency of a thorough irradiation of said gaseous machining effluent with said laser beam.

3. The method defined in claim 1 or claim 2, further comprising venting the irradiated machining effluent into the atmosphere upon filtering off of non-gaseous components thereof.

4. An electrical machining apparatus for machining a conductive workpiece wherein a machining electric current is passed across a machining gap flooded with a liquid machining medium between a tool electrode and the conductive workpiece to decompose the supplied liquid machining medium and to erosively remove material from the conductive workpiece whereby a gaseous machining effluent comprising noxious gases is evolved from the machining gap, the apparatus including:

means for collecting the evolved machining effluent in a space immediately above the liquid machining medium and confining the collected effluent against direct escape into the atmosphere;

fluid conduit means associated with said means for collecting for communicating said space with the atmosphere through an elongate fluid flow passage therein and drawing the effluent through said passage; and laser means for irradiating the machining effluent flowing along said passage with a laser beam guided to pass longitudinally through said elongate fluid flow passage whereby to decompose at least a major portion of the noxious gases in said flowing machining effluent into their constituent elements.

5. The apparatus defined in claim 4, further comprising means for laterally oscillating the optical axis of said laser beam passing longitudinally through said elongate fluid flow passage within a width thereof to facilitate the decomposition of said gases in said machining effluent.

6. The apparatus defined in claim 4 or claim 5 wherein said conduit means defining said elongate fluid flow passage is in a form of combined U-shapes, further comprising a plurality of mirror means disposed at a like plurality of corner elbow portions of said conduit means for reflecting said laser beam so that it passes longitudinally through said elongate fluid flow passage.

7. The apparatus defined in claim 5 wherein said conduit means defining said elongate fluid flow passage is in a form of combined U-shapes, further comprising a plurality of mirror means disposed at a like plurality of corner elbow portions of said conduit means for reflecting said laser beam so that it passes longitudinally through said elongate fluid flow passage, and wherein said oscillating means comprises vibrator means attached to at least some of said mirror means for imparting mechanical vibrations thereof transverse to the flowing machining effluent.

8. The apparatus defined in claim 4 or claim 5, further comprising filter means disposed in an outlet side of said conduit means for filtering off of non-gaseous components of said laser-machining effluent.

* * * * *